United States Patent [19]

Goddard et al.

[11] Patent Number: 4,562,057
[45] Date of Patent: Dec. 31, 1985

[54] PREPARATION OF LOW-CARBON VANADIUM NITRIDE

[75] Inventors: John B. Goddard, Grand Island; Rodney F. Merkert, Buffalo, both of N.Y.

[73] Assignee: Union Carbide Corporation, Danbury, Conn.

[21] Appl. No.: 594,664

[22] Filed: Mar. 29, 1984

[51] Int. Cl.[4] ............................................. C01B 21/26
[52] U.S. Cl. .................................. 423/409; 75/123 B; 420/424; 423/371
[58] Field of Search ...................... 423/384, 409, 371

[56] References Cited

U.S. PATENT DOCUMENTS

| | | | |
|---|---|---|---|
| 3,745,209 | 7/1973 | Middelhoek | 423/409 |
| 3,872,136 | 3/1975 | Middelhoek | 423/409 |
| 3,979,500 | 9/1976 | Sheppard et al. | 423/409 |
| 4,040,814 | 8/1977 | Merkert | |
| 4,460,697 | 7/1984 | Hara et al. | 423/409 |
| 4,515,763 | 5/1985 | Boudart et al. | 423/409 |

FOREIGN PATENT DOCUMENTS

| | | | |
|---|---|---|---|
| 55-62804 | 5/1980 | Japan | 423/409 |
| 57-34007 | 2/1982 | Japan | 423/384 |

OTHER PUBLICATIONS

Roubin and Paris in C. R. Acad. Sci. Paris 260, pp. 3088–3091, (1965).
U.S. Bureau of Mines, Report of Investigations 8079, (1975).

*Primary Examiner*—John Doll
*Assistant Examiner*—Wayne A. Langel
*Attorney, Agent, or Firm*—John R. Doherty

[57] ABSTRACT

A low-carbon vanadium nitride is prepared in a furnace at an elevated temperature of about 1400° C. under nitrogen atmosphere from a feed material containing a mixture of vanadium oxynitride and carbon. The vanadium oxynitride is prepared by the partial ammonia reduction of a vanadium-containing oxidic compound such as ammonium metavanadate ($NH_4VO_3$) or oxides of vanadium such as $V_2O_3$ and $V_2O_5$.

14 Claims, No Drawings

PREPARATION OF LOW-CARBON VANADIUM NITRIDE

BACKGROUND OF THE INVENTION

1. Field of the Invention

The present invention relates to vanadium additions to steel and more particularly to an essentially oxygen-free, low-carbon vanadium nitride additive and to an improved process for preparing the same.

2. Description of the Prior Art

It has already been proposed to produce vanadium nitride by ammonia reduction of ammonium metavanadate according to the following reaction:

$$21NH_4VO_3 + 14NH_3 \rightarrow 21VN + 63H_2O + 7N_2$$

However, even with excess ammonia, the reaction is difficult to bring to completion, i.e., to an essentially oxygen-free product. Long reaction times, large excesses of ammonia, and fairly small charges are needed to achieve essentially pure vanadium nitride.

For example, Roubin and Paris in C.R. Acad. Sci. Paris 260, pages 3088–91 (1965) treating ammonium metavanadate samples for 20 hours in a current of ammonia and hydrogen achieved vanadium nitride products containing 2.8 wt.% oxygen, 0.6 wt.% oxygen, and 0.1 wt.% oxygen at temperatures of 700° C., 900° C. and 1000° C., respectively. From an economic standpoint, it is undesirable to perform the nitriding for long periods of time with large excesses of ammonia which are needed to bring the oxygen level below 1.0 wt.%. Although high temperatures increase the rate of oxygen removal, they also increase the rate at which ammonia is catalytically decomposed to nitrogen and hydrogen, which as a mixture are much less efficient nitriding agents than ammonia.

Guidotti, Atkinson and Kesterke in U.S. Bureau of Mines, Report of Investigations 8079, (1975) have shown that the initial rates of reaction of ammonia with $V_2O_3$ in various materials begin to decline above about 800° C. for nonmetallic materials of construction, and above 700° C. for metallic materials of construction. However, essentially oxygen-free vanadium nitride could not be produced below 1000° C. in the nonmetal reactors and below about 900° C. in metallic reactors, even with a substantial stoichiometric excess of ammonia for small charges (e.g., 5 gram) of $V_2O_3$. Fairly rapid oxygen removal from $V_2O_3$ by $NH_3$ in an $Al_2O_3$ reactor at 800° C. was achieved, however, but the final product contained 3.8 wt.% oxygen. A product containing less than 1.0 wt.% oxygen is desirable for use in the steel industry.

Another known approach to obtaining a low-oxygen vanadium nitride is by carbon reduction of an oxide such as $V_2O_3$ in a nitrogen atmosphere according to the following reaction:

$$N_2 + V_2O_3 + 3C \rightarrow 2VN + 3CO$$

An excess of carbon over that for the reaction is required to produce low-oxygen products. This results in products containing excess carbon, i.e., materials for which some carbon is substituted for nitrogen. Low-carbon products can be produced by very high temperature operation in a nitrogen atmosphere, e.g., 1800° to 2000° C., where close to the stoichiometric amount of carbon for the above reaction can be used. However, even this stoichiometric amount represents a high usage of the rather expensive thermal grade carbon required.

Another approach to obtaining low-oxygen, low-carbon vanadium nitride using the stoichiometric carbon of the above reaction is taught in U.S. Pat. No. 4,040,814 to R. F. Merkert. In this patent, the $V_2O_3$ and carbon mixture is subjected to a cyclic vacuum-nitrogen-vacuum treatment at temperatures of between 1100° and 1500° C. However, up to five cycles of alternate vacuum and nitriding treatment may be required to produce a vanadium nitride product containing less than 2 wt.% oxygen and carbon in the aggregate.

SUMMARY OF THE INVENTION

The present invention provides a substantially different approach to the preparation of an essentially oxygen-free, low-carbon vanadium nitride material for use as an additive to steel. In the process of the present invention, a finely divided vanadium oxynitride compound containing between about 3 and 20 wt.% oxygen is mixed together with a finely divided carbonaceous material, e.g., thermal grade carbon, and the mixture is then heated to a temperature of between about 1200° C. and 1800° C. in a furnace under an inert atmosphere of argon or nitrogen, for example, or a vacuum.

The vanadium oxynitride compound is prepared according to the present invention by the partial ammonia reduction of a vanadium-containing oxidic compound such as an ammonium vanadate or an oxide of vanadium. The ammonia reduction of the vanadium-containing oxidic compound can be readily carried to a level of between about 3 and 20 wt.% oxygen, for example, by heating the material to a temperature of between about 850° C. and 950° C. This partial reduction of the oxidic compound substantially reduces the amount of carbon required to complete the reduction to a vanadium nitride material containing less than about 1 wt.% oxygen.

A process for producing low-carbon vanadium nitride according to the present invention comprises:

(a) providing a vanadium-containing oxidic compound;

(b) exposing the vanadium-containing oxidic compound to a reducing atmosphere containing ammonia or mixtures of nitrogen and hydrogen, at an elevated temperature sufficient to partially reduce the oxidic compound and yield a vanadium oxynitride material containing from about 3 to 20% by weight oxygen;

(c) blending the vanadium oxynitride material with a finely divided carbonaceous material in an amount such that the carbon blended in the mixture equals or exceeds the stoichiometric amount necessary to react with substantially all of the oxygen contained in the vanadium oxynitride material; and (d) subjecting the blended mixture formed in step (c) to an inert or nitrogen-containing atmosphere at an elevated temperature sufficient to effect removal of oxygen from the vanadium oxynitride material and produce a substantially oxygen-free, low-carbon vanadium nitride.

By the term "low-carbon vanadium nitride" as used herein is meant a vanadium nitride compound containing up to about 7.0 wt.% carbon.

DESCRIPTION OF THE PREFERRED EMBODIMENTS

It has been found according to the present invention that a vanadium oxynitride material, i.e., V(O,N) containing from about 3 to 20% by weight oxygen is an ideal furnace feed for making a low-carbon vanadium nitride product at elevated temperatures (e.g., 1400° C.) under an inert atmosphere of argon or nitrogen or a vacuum. The vanadium oxynitride material can be readily prepared with 3% by weight or more of oxygen by the ammonia reduction of known and readily available vanadium-bearing materials such as ammonium metavanadate ($NH_4VO_3$) and the oxides of vanadium such as $V_2O_3$ and $V_2O_5$. The V(O,N) product is then mixed with at least the stoichiometric amount of carbon to react with oxygen contained in the vanadium oxynitride material. In the preferred embodiment of the present invention, an excess of carbon above the stoichiometric amount is employed at typical operating temperatures of 1200° to 1400° C. in order to remove the oxygen to levels below about 1.0% by weight. Generally, an excess of carbon to give about 2-6% by weight carbon in the product will be sufficient to reduce the oxygen level to less than 1 percent.

The ammonia reduction of the vanadium-containing oxidic compound may be carried out in a single stage or multiple stages in the practice of the present invention. A multiple stage reduction process is preferred in the case where the oxidic compound is a pentavalent vanadium compound since the melting point of $V_2O_5$ is fairly low, i.e., about 660° C. A suitable starting temperature in this case is therefore about 600° C. $V_2O_5$ is often the initial thermal degradation product of ammonium vanadate.

The preferred vanadium-containing oxidic compounds for use in the process of the present invention are ammonium metavanadate and the oxides $V_2O_3$ and $V_2O_5$. Ammonium metavanadate is most commonly the product made by vanadium plants since it can be recovered by precipitation or recrystallization in a relatively pure state. From this, $V_2O_3$ can be prepared by a cocurrent reduction by the ammonia and hydrogen generated through thermal decomposition of $NH_4VO_3$. Alternatively, the ammonium metavanadate may serve directly as the feed for vanadium oxynitride preparation. Other ammonium vanadates can also be used as the feed such as ammonium decavanadate $(NH_4)_6V_{10}O_{28}\cdot XH_2O$, ammonium hexavanadate $(NH_4)_2V_6O_{16}$ or even partially reduced ammonium vanadates. All ammonium vanadates thermally decompose to oxides. In addition, other vanadium oxides may be used as well, such as intermediate vanadium oxides, e.g., $V_6O_{13}$ or $V_2O_4$ and lower oxides such as VO.

The vanadium-containing oxidic compound should be used in a finely divided or powdered state, e.g., about 100 mesh, in order to provide a reasonably high surface area for the reduction reaction to occur.

The initial reduction of the vanadium-containing oxidic compound is preferably carried out in ammonia as indicated above. However, a mixture of nitrogen and hydrogen can also be used although the reduction reaction will be slower and less complete than in the case where ammonia is used. It may be necessary to employ higher temperatures (e.g., about 1000° C.).

The ammonia reduction of the vanadate or vanadium oxide should reduce the oxygen level significantly below that in $V_2O_3$, i.e., below an oxygen to vanadium weight ratio of about 0.47. Any reduction below this ratio will in effect reduce the carbon requirement for the subsequent reduction to vanadium carbonitride, although in practical terms a O/V ratio of at least 0.30 or lower should be achieved during the first reduction step.

The ammonia reduction can be carried out in most any apparatus where efficient gas contact can readily occur. A fluidized bed apparatus is suitable, although spouted or fixed beds may also be employed. A countercurrent flow of ammonia and feed material allows the most efficient usage of ammonia. The extent of the nitriding and oxygen removal in this ammonia reduction step will depend on the economics of the process. Generally speaking, the more oxygen removal that takes place during the ammonia reduction step, the less carbon will be required during the final oxygen removal in the furnace. In addition, the furnace throughput increases significantly with increased oxygen removal during the ammonium reduction step.

As a general rule, ammonia consumption during this initial reduction step will increase significantly when the oxygen level is decreased in the vanadium-containing oxidic feed material. As a consequence, it has been found that an oxygen level of about 3.0% by weight in the feed represents a practical lower limit for the ammonia reduction step, although it is recognized that a product containing less than 1% by weight oxygen can be achieved by ammonia reduction alone.

It is preferred to employ ammonia as the sole reducing gas in the initial reduction of the vanadium-containing oxidic compound. It is also possible, however, to employ inert gases such as argon or nitrogen along with ammonia as an aid to fluidization. A reducing gas such as hydrogen can also be used. As indicated before, a nitrogen and hydrogen mixture can also be employed without ammonia; however, the reaction is slow and not as efficient.

The final oxygen removal step is carried out by blending the vanadium oxynitride material with a finely divided carbonaceous material, e.g., thermal grade carbon, in amounts which exceed the stoichiometric amount required to remove the oxygen. To insure a final product containing less than about 1.0% by weight oxygen, an excess over the stoichiometric addition of carbon to give a vanadium carbonitride product, V(C,N), containing from about 2 to 6% by weight residual carbon is necessary. This applies to reaction temperatures of between about 1200° and 1400° C. At higher temperatures, e.g., 1800° C., less carbon is required to reduce the oxygen to levels of less than 1% by weight.

The mixture is preferably pelletized or briquetted to provide intimate contact of the reagents. A binder such as starch may be used along with water to increase the pellet or briquet strength. The pelletizing or briquetting procedure may be essentially the same as described, for example, in U.S. Pat. No. 3,334,992.

The pellets or briquets are then furnaced preferably in a nitrogen atmosphere at a temperature high enough to effect the removal of oxygen in a reasonable length of time. As indicated above, the furnace temperature should be in a range of between about 1200° and 1800° C. The preferred furnace temperature is about 1400° C. The nitrogen may be maintained at about atmospheric pressure during this final oxygen removal step. There appears to be no significant advantage in operating the furnace above or below atmospheric pressure.

Although the final reduction step can also be carried out under argon or vacuum, it appears that the reduction reaction is more efficiently performed under a nitrogen atmosphere.

Some nitrogen can be removed from the final vanadium nitride product by cooling it in argon or under a vacuum as practiced according to U.S. Pat. No. 4,040,814 to Merkert. As also described in this patent, the cyclic vacuum-nitrogen-vacuum treatment can be used to remove oxygen instead of a constant atmosphere of nitrogen in the final carbon reduction step.

The present invention will be further illustrated by the following examples:

EXAMPLE I

Ammonium metavanadate as a crystalline powder was fluidized in ammonia in a Vycor tube for 1 hr. at 675°–700° C. and 3–4 hrs. at 950° C. The product contained 73.3% V, 12.6% N, and 15.3% O by analysis (total: 101.2%). The oxygen analysis was performed by neutron activation, a fairly accurate method, and deviations of the analyses from 100% were assumed to be caused by inaccurate nitrogen analyses. The O/V weight ratio was 0.21, vs. the starting theoretical value of 0.785 for the $V_2O_5$ content of $NH_4VO_3$. Thus, about 73% of the oxygen was removed by the ammonia reduction. To remove 15.3% O as CO, 11.5 g. carbon/100 g. V(O,N) is the stoichiometric requirement. For the final reduction, a 16.8 g. carbon/100 g. V(O,N) mix was prepared. This is a 5.3 g. carbon excess per 100 g. V(O,N), or sufficient excess carbon to give a final product theoretically containing about 6% carbon. The mix was pressed into ¾" diameter pellets after a little water was added. The pellets were dried, then heated after 6 hrs. with a 1 atmosphere $N_2$ flow though the furnace. The product was cooled in nitrogen. The product by analysis contained 78.5% V, 15.3% N, 6.56% C, and 0.24% O (total 100.6%). Thus, the oxygen was readily reduced to <1% using a C/V weight ratio of 0.23. For $V_2O_3$, the stoichiometric C/V weight ratio requirement is 0.35, and a carbon excess would be required at this furnace temperature (1400° C.) to reduce the oxygen to <1%.

EXAMPLE II

Ammonium metavanadate crystalline powder was reduced in boats with ammonia for 1 hr. at 700° C. and 3 hrs. at 950° C. The product analysis was 74.4% V, 14.3% N, 12.0% O (100.7% total). The O/V weight ratio was 0.16, vs. 0.785 for $V_2O_5$. Thus, about 79% of the oxygen was removed by the ammonia reduction. To remove 12.0% O as CO, 9.0 g. carbon/100 g. V(O,N) is the stoichiometric requirement. A mix of 14.6 g. carbon/100 g. V(O,N) was prepared. This is a 5.6-g. excess of carbon per 100 g. V(O,N), or sufficient excess carbon to give a final product theoretically containing 6% carbon. After adding a little water, the mix was pressed into ¾" diameter pellets. The pellets were dried, then furnaced about 6 hrs. under 1 atmosphere nitrogen. The product was cooled in nitrogen. The product by analysis contained 78.3% V, 16.9% N, 5.35% C, and 0.25% O (total 100.8%). The C/V weight ratio used for this test was 0.20, vs. a C/V weight ratio of 0.35 stoichiometrically required for the reduction of $V_2O_3$.

EXAMPLE III

Ammonium metavanadate as a crystalline powder was reduced in several batches in boats in a laboratory tube furnace (Vycor tube) for 1 hr. at 700° and 3 hrs. at 950° C. The products were homogenized and subjected to reduction in boats for in additional 3 hrs. at 950° C. in the tube furnace in an ammonia atmosphere. The blended material analyzed 76.3% V, 17.4% N, and 6.4% O (total 100.1%). The O/V ratio was 0.084, vs. the starting theoretical value of 0.785 for the $V_2O_5$ content of $NH_4VO_3$. Thus, about 89% of the oxygen was removed by the ammonia reduction. To remove 6.4% O as CO, 4.8 g. carbon/100 g. V(O,N) is the stoichiometric requirement. For the final reduction, a mix containing 7.68 g. carbon/100 g. V(O,N) was prepared. This was 2.88 g. carbon excess per 100 g. V(O,N), or sufficient excess carbon to give a final product containing 3% carbon. Water was added and the blend was pressed into ¾" pellets. These were dried, then furnaced under nitrogen for 6 hrs. at 1400° C. The product was cooled under nitrogen. The product analysis was 78.1% V, 18.5% N, 3.32% C, and 0.86% O (total 100.8%). The C/V weight ratio used for this preparation was 0.10, vs. a C/V weight ratio of 0.35 stoichiometrically required for the carbon reduction of $V_2O_3$.

EXAMPLE IV

Ammonium metavanadate as a crystalline powder, together with small amounts of high-oxygen V(O,N) materials, was fluidized in several batches in ammonia for 1 hr. at 700° C., then 3 hrs. at 850° C., using a Vycor tube. The products were blended. Product analysis: 76.8% V, 21.0% N, 3.78% O (total 101.6%). The oxygen reduction to 3.78%, vs. 6–15% for Examples I–III, is attributable to the lower second-stage temperature (850° C. vs. 950° C.). To remove 3.78% O as CO, 2.84 g. carbon/100 g. V(O,N) is the stoichiometric requirement. A mix was prepared using 5.72 g. carbon/100 g. V(O,N). This amount of carbon was sufficient to provide a product containing 3% carbon provided all the oxygen was removed. The mix was pelletized after adding a little water, and then dried and furnaced 6 hrs. at 1400° C. under argon. Samples of the resulting product were analyzed; the product contained 81.3% V, 12.5% N, 4.05% C, and 1.98% O (total 99.8%). Furnacing in argon was insufficient to remove the oxygen to a level <1%. The pellets were refurnaced 5.4 hrs. at 1400° C. under nitrogen and reanalyzed. The product contained 77.4% V, 18.1% N, 3.34%C, and 0.73% O (total 99.6%). The C/V ratio used for this preparation was only 0.074, vs. a C/V ratio of 0.35 stoichiometrically required for the carbon reduction of $V_2O_3$.

Samples of the vanadium carbonitride prepared as described in Examples III and IV were readily soluble in steel; approximately 93% of the vanadium dissolved in 3 minutes in AISI 1020 steel at 1600° C. when added to give an alloy containing 0.15% V.

An important advantage of producing a vanadium nitride according to the present invention is that the furnace can be charged with higher grade mixes than heretofore possible. For example, the grade of mix for producing a vanadium nitride directly from $V_2O_3$ is 54.8 wt.% vanadium even for just the stoichiometric amount of carbon with no added binding agent. However, for a V(O,N) material of composition 78 wt.% vanadium and 4.0 wt.% oxygen, the feed grade is 73.6 wt.% vanadium even when twice the stoichiometric carbon needed to remove oxygen is added. Thus, furnace throughput can be increased, and for batch type furnaces which are commercially used, the fixed costs per batch, i.e., loading, unloading, evacuating, backfilling with nitrogen, etc., are also reduced on a per pound vanadium basis.

We claim:

1. A process for producing low-carbon vanadium nitride comprising:
   (a) providing a vanadium-containing oxidic compound selected from the group consisting of ammonium vanadates and oxides of vanadium;
   (b) exposing said vanadium-containing oxidic compound to a reducing atmosphere containing a material selected from the group consisting of ammonia and mixtures of nitrogen and hydrogen, at an elevated temperature sufficient to partially reduce said vanadium-containing oxidic compound and yield a vanadium oxynitride material containing from about 3 to about 20 wt.% oxygen;
   (c) blending said vanadium oxynitride material with a finely divided carbonaceous material in an amount such that the carbon blended in the mixture equals or exceeds the stoichiometric amount necessary to react with substantially all of the oxygen contained in said vanadium oxynitride material and to produce a vanadium nitride containing from about 2 to about 6 wt.% carbon; and
   (d) subjecting the blended mixture formed in step (c) to a heat treatment in an inert or nitrogen-containing atmosphere or vacuum and at an elevated temperature sufficient to effect removal of oxygen from said vanadium oxynitride material and produce a substantially oxygen-free, low-carbon vanadium nitride material.

2. A process according to claim 1 wherein the vanadium-containing oxidic compound has an oxygen to vanadium weight ratio of more than about 0.47.

3. A process according to claim 1 wherein the vanadium-containing oxidic compound is a vanadate selected from the group consisting of ammonium metavanadate, ammonium decavanadate, ammonium hexavanadate and partially reduced ammonium vanadates.

4. A process according to claim 1 wherein the vanadium-containing oxidic compound is an oxide of vanadium selected from the group consisting of $V_2O_3$, $V_2O_5$, intermediate and lower vanadium oxides.

5. A process according to claim 1 wherein the vanadium-containing oxidic compound is ammonium metavanadate.

6. A process according to claim 1 wherein the vanadium-containing oxidic compound is reduced in a series of steps to a lower vanadium-containing oxidic compound having an oxygen to vanadium weight ratio of 0.30 or lower.

7. A process according to claim 1 wherein the vanadium-containing oxidic compound is reduced by ammonia at a temperature of at least about 600° C.

8. A process according to claim 1 wherein the vanadium oxynitride material is blended together with finely divided thermal grade carbon.

9. A process according to claim 1 wherein the blended mixture is heated to a temperature of from about 1200° to about 1800° C. in a nitrogen-containing atmosphere.

10. A process according to claim 9 wherein the blended mixture is heated to a temperature of about 1400° C. in nitrogen at about atmospheric pressure.

11. A process according to claim 1 wherein the blended mixture is heated to a temperature of from about 1200° to about 1800° C. in an argon atmosphere.

12. A process according to claim 1 wherein the blended mixture is heated to a temperature of from about 1200° to about 1800° C. in a vacuum.

13. A process for producing low-carbon vanadium nitride comprising:
   (a) providing a vanadium-containing oxidic compound selected from the group consisting of ammonium metavanadate, ammonium decavanadate, ammonium hexavanadate, partially reduced ammonium vanadates, vanadium trioxide, vanadium pentoxide, and intermediate and lower vanadium oxides;
   (b) exposing said vanadium-containing oxidic compound to a reducing atmosphere containing ammonia at an elevated temperature of at least about 600° C. to partially reduce said vanadium-containing oxidic compound and yield a vanadium oxynitride material containing from about 3 to about 20 wt.% oxygen;
   (c) blending said vanadium oxynitride material with a finely divided carbonaceous material in an amount such that the carbon blended in the mixture exceeds the stoichiometric amount necessary to react with substantially all of the oxygen contained in said vanadium oxynitride material and to produce a vanadium nitride containing from about 2 to about 6 wt.% carbon; and
   (d) subjecting the blended mixture formed in step (c) to a heat treatment in a nitrogen atmosphere at an elevated temperature in the range of from about 1200° to about 1800° C. to effect removal of oxygen from said vanadium oxynitride material and produce a substantially oxygen-free, low-carbon vanadium nitride material.

14. A process according to claim 13 wherein the vanadium-containing oxidic compound has a particle size of about 100 mesh.

* * * * *